US012752602B2

(12) United States Patent
Ogilvie

(10) Patent No.: US 12,752,602 B2
(45) Date of Patent: Oct. 6, 2026

(54) COVERING STRUCTURE FOR USE WITH ROOF OPENING TO VENTILATE VEHICLE CABIN

(71) Applicant: One Eyed Jack Holdings Inc., Winnipeg (CA)

(72) Inventor: Daniel R. Ogilvie, Winnipeg (CA)

(73) Assignee: One Eyed Jack Holdings Inc., Winnipeg (CA)

( * ) Notice: Subject to any disclaimer, the term of this patent is extended or adjusted under 35 U.S.C. 154(b) by 402 days.

(21) Appl. No.: 18/508,496

(22) Filed: Nov. 14, 2023

(65) Prior Publication Data

US 2024/0166022 A1 May 23, 2024

Related U.S. Application Data

(60) Provisional application No. 63/426,883, filed on Nov. 21, 2022.

(51) Int. Cl.
*B60H 1/24* (2006.01)
*B60H 1/26* (2006.01)

(52) U.S. Cl.
CPC .................................... *B60H 1/245* (2013.01)

(58) Field of Classification Search
CPC ............... B60J 7/1642; B60H 1/00464; B60H 1/00471; B60H 1/245; B60H 1/262
See application file for complete search history.

(56) References Cited

U.S. PATENT DOCUMENTS 5,080,428 A * 1/1992 Rouland .................. B60J 7/145 16/382
2003/0162490 A1* 8/2003 Klesing .................. B60H 1/245 454/137

FOREIGN PATENT DOCUMENTS

CN 1196305 A * 10/1998

OTHER PUBLICATIONS

CN1196305 and translation (Year: 1998).*

* cited by examiner

*Primary Examiner* — Steven S Anderson, II
(74) *Attorney, Agent, or Firm* — Kyle R Satterthwaite; Ryan W Dupuis; ADE & COMPANY INC.

(57) ABSTRACT

A covering structure for use with a roof opening in a vehicle to ventilate an interior cabin thereof comprises a base supported on an exterior side of a vehicle roof, an upstanding peripheral wall enclosing a space above the roof and registered with the roof opening, one or more openings in the wall to communicate the space with an ambient environment and a securement device for anchoring to the vehicle, which is configured to extend from the space enclosed by the peripheral wall and through the roof opening to the interior cabin so as to attach inside the vehicle. The covering structure can be operated as an air scoop by closing, using movable covers, the majority of the wall openings except for those facing the wind, so that the peripheral wall acts to duct the admitted air into the cabin through the roof opening.

12 Claims, 6 Drawing Sheets

COVERING STRUCTURE FOR USE WITH ROOF OPENING TO VENTILATE VEHICLE CABIN

This application claims the benefit under 35 U.S.C. 119(e) of U.S. provisional application Ser. No. 63/426,883 filed Nov. 21, 2022.

FIELD OF THE INVENTION

The present invention relates generally to a covering structure for use with a roof opening in a vehicle, typically a self-propelled land vehicle, to ventilate an interior cabin of the vehicle, and more particularly to such a covering structure with a gasket for forming a seal with the roof.

BACKGROUND

Overnight camping in self-propelled passenger vehicles is becoming increasingly popular, but such vehicles typically are not configured to support occupants for extended durations, especially while the vehicles are inactive or (turned) off states. Proper ventilation of an occupant cabin of such a vehicle enhances comfort while sleeping. Structures for converting a window in a door of the vehicle to a ventilation structure are well known and have been commercialized by the applicant. However, many vehicles additionally have roof openings as part of sunroofs, which openings are selectively uncoverable to permit communication between the cabin and an ambient environment, and which may be used for ventilation while sleeping overnight.

SUMMARY OF THE INVENTION

According to an aspect of the invention there is provided a covering structure for use with a roof opening of a vehicle to ventilate an interior cabin thereof, wherein the vehicle has a body supported for movement across a support surface and forming the interior cabin configured to receive occupants of the vehicle, wherein the body includes a roof at a top of the body and locating the roof opening, wherein the roof has an interior side delimiting the interior cabin and an exterior side opposite thereto, wherein the roof includes a cover movable relative to the roof opening between a closed position in which the roof opening is closed by the cover and an open position in which the roof opening is at least partially uncovered so that air can be exchanged between the interior cabin and an exterior of the vehicle, the covering structure comprising: a base configured for resting on the exterior side of the roof and defining a bottom periphery of the covering structure arranged to encompass the roof opening, wherein the base has a bottom opening configured to be registered with the roof opening of the vehicle;

wherein the base includes an annular gasket encompassing the bottom opening and configured to surround the roof opening for sealable contact with the exterior side of the roof of the vehicle;

a peripheral wall supported on the base and configured to form a space above the roof for communication with the interior cabin of the vehicle through the roof opening when the cover is in the open position;

wherein the peripheral wall locates one or more wall openings for communication of the space above the roof with an ambient environment;

wherein the base and the peripheral wall form an external portion of the covering structure arranged to be disposed externally of the body; and a securement device connected to the external portion and configured to anchor the external portion to the vehicle, wherein the securement device is configured to pass through the roof opening when the cover is in the open position for engagement in the interior cabin to urge the gasket into sealing engagement with the exterior side of the roof.

This provides an arrangement for use with an opened or uncovered roof opening to ventilate the interior cabin, which is secured to the vehicle from inside the interior cabin.

In one arrangement, the securement device includes tensionable members respectively extending from first ends connected to the external portion and to second ends free from the external portion, wherein the securement device further includes retention elements supported on the second ends of the tensionable members and configured to engage the interior cabin when the tensionable members are tensioned.

In one arrangement, the tensionable members comprise lengths of resiliently stretchable material.

In one arrangement, the tensionable members are connected to the peripheral wall at locations thereon which are arranged to register with the roof opening in a substantially perpendicular direction to a plane defined by the roof opening.

In one arrangement, the retention elements comprise rigid elongate members arranged to be sized larger than the roof opening in at least one dimension thereof for butting engagement with the interior side of the roof at opposite locations across the roof opening.

In one arrangement, the rigid elongate members are adjustable in length.

In one arrangement, the covering structure further includes hooks supported on the retention elements and arranged to be free from engagement with the interior cabin for carrying articles to be hung thereon inside the cabin.

In one arrangement, the peripheral wall includes one or more opening covers supported in respective adjacent movable relation to the one or more wall openings and respectively sized and shaped to cover the one or more wall openings, wherein each of the opening covers is movable relative to a corresponding one of the wall openings between a closed position in which the wall opening is closed by the opening cover to resist exchange of air therethrough and an open position in which the wall opening is at least partially uncovered by the flap to permit exchange of the air therethrough.

In one arrangement, the covering structure further includes a fan configured to be driven by a power source and supported by the external portion, wherein the fan is arranged to be supported at a prescribed height relative to a floor of the body opposite to the roof, wherein the prescribed height is at least as high as the roof opening.

In one arrangement, the covering structure further includes one or more precipitation shields supported externally of the space of the external portion and above the one or more wall openings, wherein the one or more precipitation shields extend outwardly from positions at or adjacent tops of the one or more wall openings for preventing passage of precipitation into the space through the one or more wall openings.

According to another aspect of the invention there is provided a covering structure for use with a roof opening of a vehicle to ventilate an interior cabin thereof, wherein the vehicle has a body supported for movement across a support surface and forming the interior cabin configured to receive occupants of the vehicle, wherein the body includes a roof at a top of the body and locating the roof opening, wherein the roof has an interior side delimiting the interior cabin and an exterior side opposite thereto, wherein the roof includes a cover movable relative to the roof opening between a closed position in which the roof opening is closed by the cover and an open position in which the roof opening is at least partially uncovered so that air can be exchanged between the interior cabin and an exterior of the vehicle, the covering structure comprising:

- a base configured for resting on the exterior side of the roof and defining a bottom periphery of the covering structure arranged to encompass the roof opening, wherein the base has a bottom opening configured to be registered with the roof opening of the vehicle;
- wherein the base includes an annular gasket encompassing the bottom opening and configured to surround the roof opening for sealable contact with the exterior side of the roof of the vehicle;
- a peripheral wall supported on the base and configured to form a space above the roof for communication with the interior cabin of the vehicle through the roof opening when the cover is in the open position;
- wherein the peripheral wall is substantially fluidically impermeable;
- wherein the peripheral wall locates a plurality of openings facing in different outward directions for communication of the space above the roof with an ambient environment;
- wherein the base and the peripheral wall form an external portion of the covering structure arranged to be disposed externally of the body;
- a securement device connected to the external portion and configured to anchor the external portion to the vehicle; and
- wherein the peripheral wall includes a plurality of opening covers supported in respective adjacent movable relation to the wall openings and respectively sized and shaped to cover the wall openings, wherein each of the opening covers is movable relative to a corresponding one of the wall openings between a closed position in which the wall opening is closed by the opening cover to resist exchange of air therethrough and an open position in which the wall opening is at least partially uncovered by the flap to permit exchange of the air therethrough.

This provides an arrangement which is suited for acting as an air scoop to duct wind into the interior cabin.

In one arrangement, the covering structure further includes a fan configured to be driven by a power source and supported by the external portion, wherein the fan is arranged to be supported at a prescribed height relative to a floor of the body opposite to the roof, wherein the prescribed height is at least as high as the roof opening.

According to yet another aspect of the invention there is provided a method of ventilating an interior cabin of a vehicle through a roof opening thereof, the method comprising:

- providing a covering structure over the roof opening in a manner forming a space above the roof for communication with the interior cabin of the vehicle through the roof opening, wherein the covering structure has a fluid-impermeable peripheral wall in upstanding relation to the roof and with a plurality of wall openings in the peripheral wall facing in different outward directions for exchanging air, wherein the covering structure further includes a plurality of opening covers respectively associated with the wall openings for selectively closing the wall openings;
- based on a direction of wind, arranging the opening covers such that a corresponding one of the wall openings facing the direction of the wind is uncovered and the remaining openings are closed to duct the wind into the interior cabin.

In one arrangement, the method further includes:

- providing a powered fan, which is driven for rotation by a power source, in suspended condition to the covering structure at a prescribed height which is at least as high as the roof opening; and
- operating the fan to push air from an ambient environment and into the interior cabin of the vehicle.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

Figure 1:
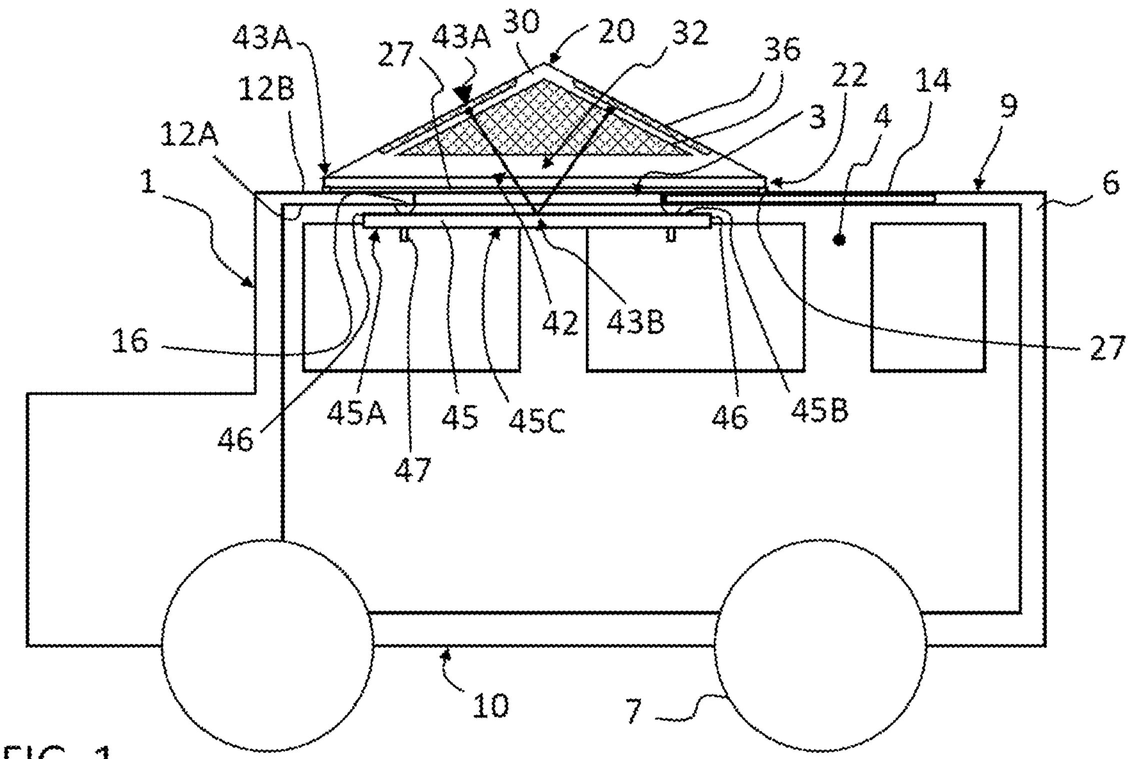
FIG. 1 schematically illustrates a longitudinal sectional view of a self-propelled land vehicle with an arrangement of covering structure according to the present invention mounted to a roof of the vehicle, where some components of the covering structure are omitted for clarity of illustration.
Figure 2:
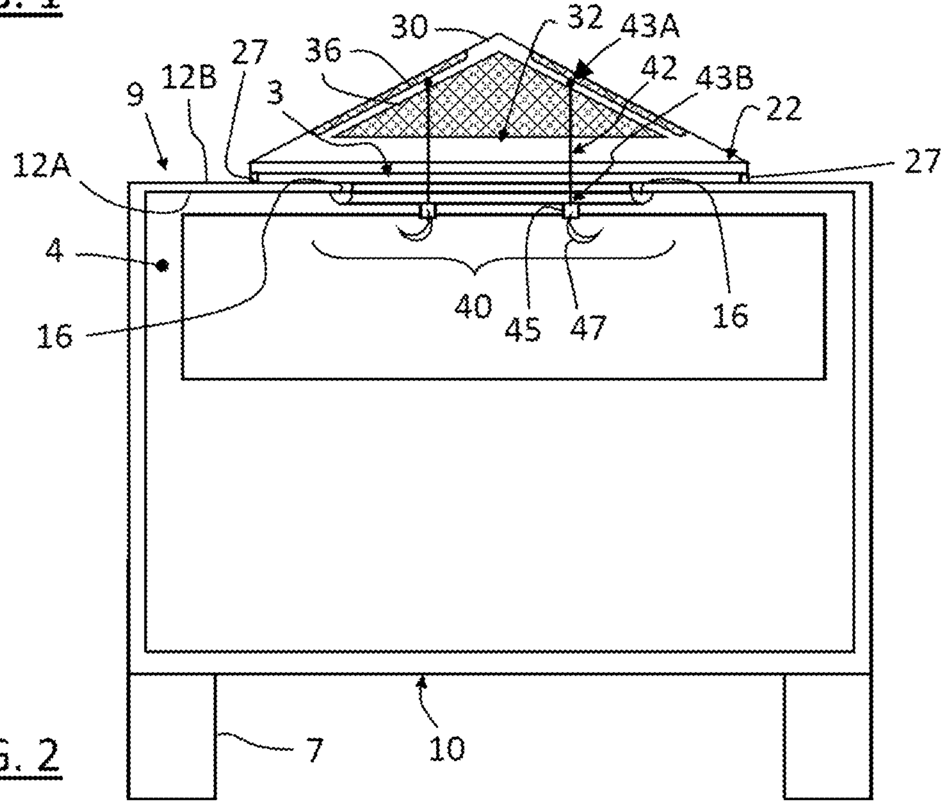
FIG. 2 schematically illustrates a lateral sectional view of the vehicle and covering structure of FIG. 1, where some components are omitted for clarity of illustration.

The accompanying figures show a covering structure 20 for a vehicle 1 for use with a roof opening 3 therein to ventilate an interior cabin 4 of the vehicle.

Generally speaking, the vehicle 1 has a body 6 supported for movement across a support surface, for example, by a plurality of rotary traction elements 7 operatively supported for engagement with the support surface, for example, wheels when the vehicle is a land vehicle. Typically, the vehicle is self-propelled meaning it has a prime mover (not shown) such as an internal combustion engine or an electric motor operatively coupled to the rotary traction elements to drive rotation of same.

The vehicle body 6 forms the interior cabin 4 which is configured to receive occupants of the vehicle, for example it is sized and shaped to receive one or more persons and has seats. When the vehicle is self-propelled, the cabin 4 typically also includes operator controls, for example a steering wheel and pedals, for actuating and controlling the prime mover for suitably driving the traction elements.

Furthermore, the body 6 includes a roof 9 at a top of the body and a floor 10 at a bottom of the body opposite the roof.

The roof 9 locates the roof opening 3, and has an interior side 12A delimiting the interior cabin 4 and an exterior side 12B opposite thereto, which is exposed to an external or ambient environment of the vehicle. The roof 9 includes a cover 14, typically in the form of a window, which is movable relative to the roof opening 3 between a closed position in which the roof opening is closed by the cover 14 and an open position in which the roof opening 3 is at least partially uncovered so that air can be exchanged between the interior cabin 4 and an exterior of the vehicle. Typically, the interior cabin 4 includes one or more trim pieces 16 (when there are plural, they may be considered as a set) along the roof opening 3 to delimit the same on the interior side 12A of the roof, which may help form a seal with the movable roof opening cover 14 in the closed position thereof, for example by carrying an annular gasket on a topside of the roof opening trim 16.

Figure 3:
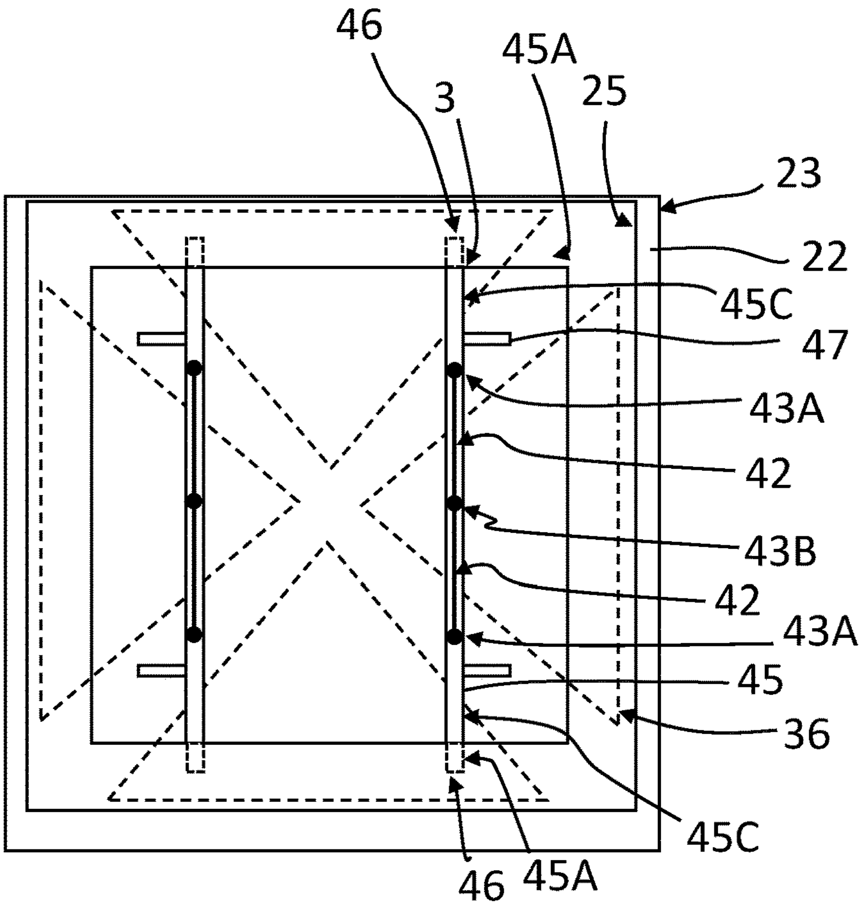
FIGS. 3 and 4 schematically illustrate top and bottom plan enlarged partial views, respectively, of the covering structure mounted to the vehicle.
Figure 4:
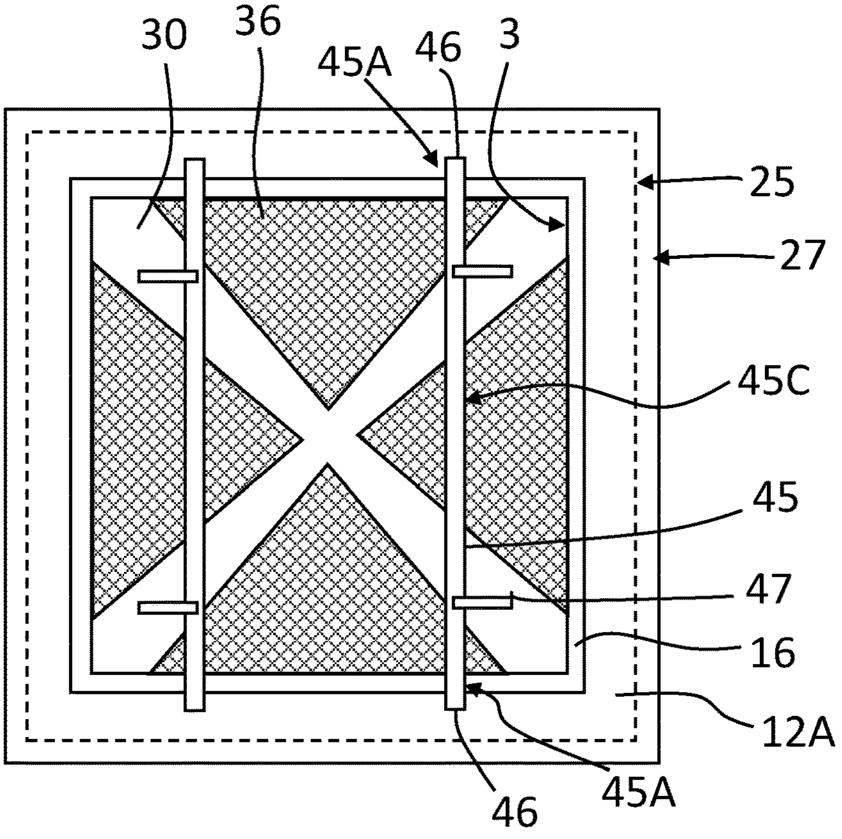
Figure 5:
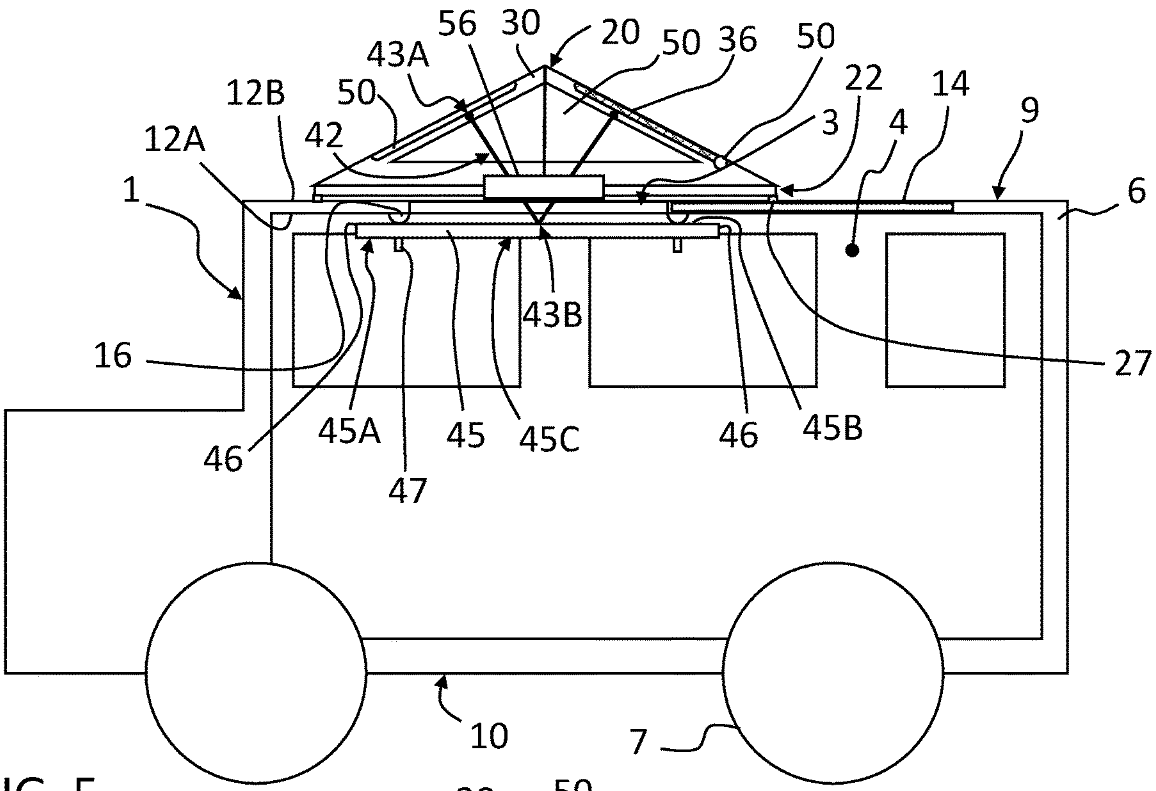
FIGS. 5 through 8 are similar to FIGS. 1 through 4 and show the same arrangement of covering structure mounted to the vehicle but with components previously omitted.
Figure 6:
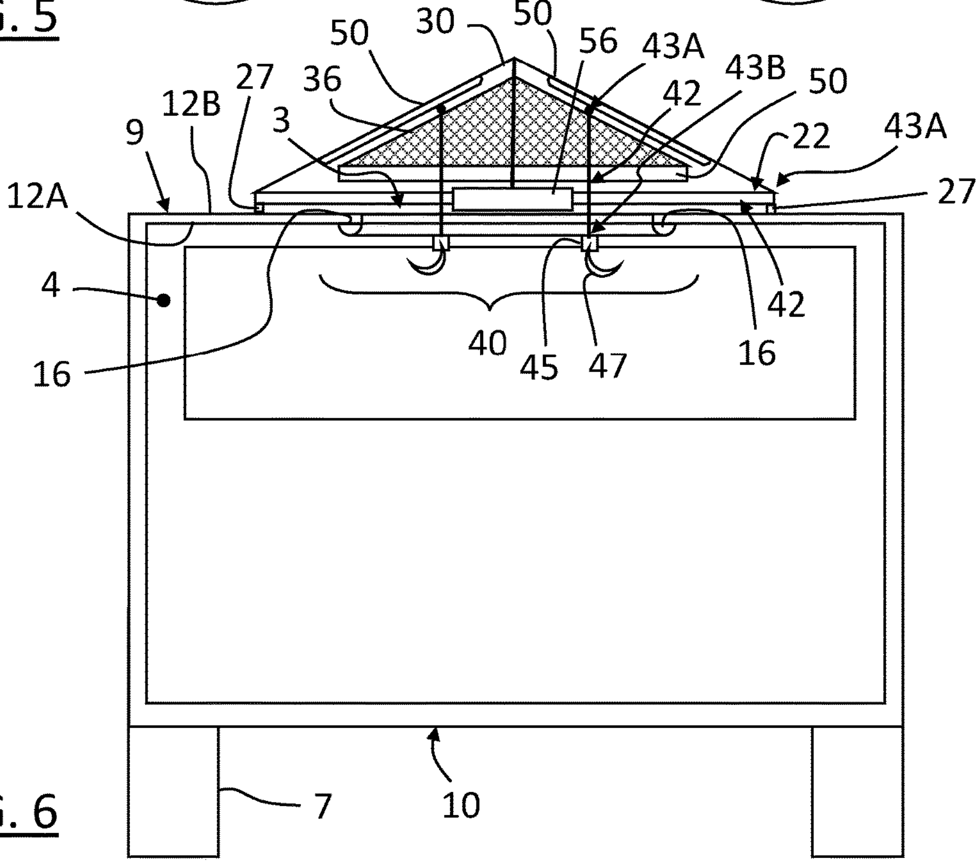
Figure 7:
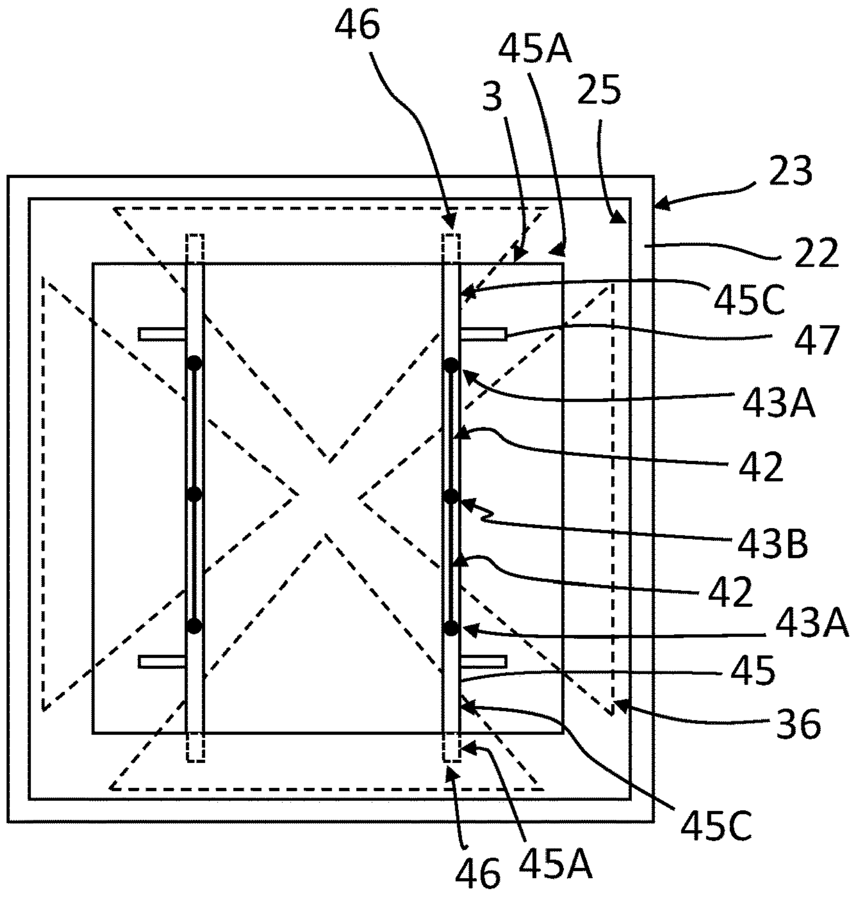
Figure 8:
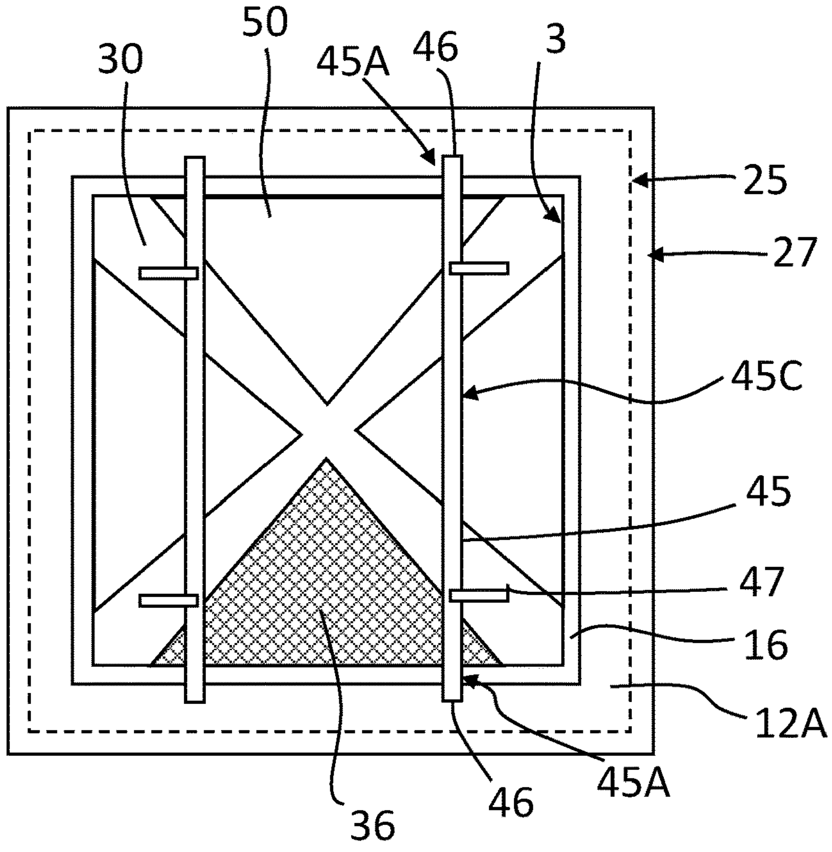

Turning now to the covering structure 20, this generally comprises a base 22 configured for resting on the exterior side 12B of the roof and defining a bottom periphery 23 of the covering structure arranged to encompass the roof opening 3, the latter two of which are more clearly shown in FIGS. 3 and 4. The base 22 has a bottom opening 25 configured to be registered with the roof opening 3 of the vehicle. The bottom opening 25 may be coincident with the bottom periphery 23 or may be distinct therefrom, for example a smaller opening formed by a floor extending inwardly from the periphery 23.

The base 22 includes an annular gasket 27 encompassing the bottom opening 25 and configured to surround the roof opening 3 for sealable contact with the exterior side 12B of the roof of the vehicle. The gasket 27 may be registered with the with the bottom periphery 23, bottom opening 25 or at an intermediate location therebetween when there is provided a floor forming the base opening 23 sized smaller than the base periphery. The gasket 27 is endless, in other words it forms a closed loop. The gasket may be made of foam, air, rubber or another resiliently compressible material, which is compressible in a thickness direction.

The structure 20 further includes a peripheral wall 30 supported on the base 22 and configured to form a space 32 above the vehicle roof 9 for communication with the interior cabin 4 of the vehicle through the roof opening 3 when the roof opening cover 14 is in the open position. The peripheral wall 30 is in upstanding relation to the roof 9 of the vehicle in order to form the space or volume. The space 32 is substantially delimited by the peripheral wall 30, the base 30 and the bottom opening 25, the latter two of which typically lie in a substantially common plane.

To communicate the space 32 above the roof 9 with the ambient environment, particularly for airflow, the peripheral wall 30 locates one or more wall openings 36. The peripheral wall 30 is otherwise fluidically impermeable. When the peripheral wall has multiple openings, they face in different outward directions so as to admit into the space 32 airflow or wind from different directions.

As such, the base 22 and the peripheral wall 30 form an external portion of the covering structure 20 arranged to be disposed externally of the vehicle body 6.

To anchor the external portion to the vehicle, the covering structure 20 includes a securement device 40 connected to the external portion and configured for anchoring to the vehicle. More specifically, the securement device 40 is configured to pass through the roof opening 3, when the associated cover 14 is in the open position, for engagement in the interior cabin 4 to urge the gasket 27 into sealing engagement with the exterior side 12B of the roof. Furthermore, the securement device 40 is configured to extend from the space 32 of the external portion and through the bottom opening 25 in the base 22 for subsequent passage through the roof opening 3 and into the vehicle cabin 4.

In the illustrated arrangement, the securement device 40 includes a plurality of tensionable members 42 respectively extending from first ends 43A connected to the external portion of the covering structure and to second ends 43B free from the external portion, where there are supported retention elements 45 of the securement device configured to engage the interior cabin 4 when the tensionable members 42 are tensioned. The tensionable members 42 are connected at spaced positions to the external portion so as to distribute an applied force thereto, which is generated upon tensioning of the members 42 during or after attachment in the vehicle cabin 4. In the illustrated arrangement, the tensionable members 42 are connected to the peripheral wall 30 at positions thereon registered with the roof opening 3 in a substantially normal or perpendicular direction to a plane defined by the roof opening 3, which is typically coplanar with a portion of the roof surrounding the opening 3, so that when the securement device 40 engages the vehicle cabin, the members 42 are tensioned in the substantially normal direction to the vehicle roof to maximize a force applied to the gasket 27 for sealing engagement with the vehicle roof 9. When the vehicle 1 is rested or parked on a substantially horizontal surface, the substantially normal or perpendicular direction to the vehicle roof is a substantially vertical direction.

Figure 11:
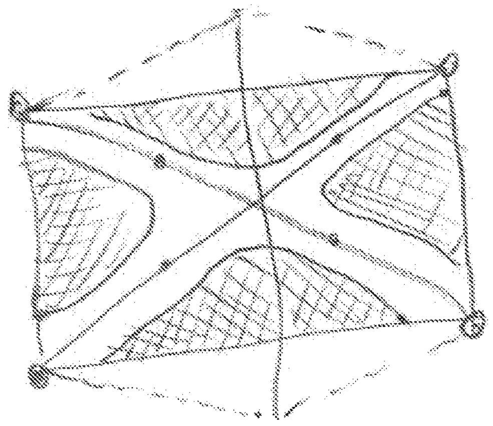
FIGS. 11 through 13 are substantially non-schematic plan views and side views, respectively, of the arrangement of covering structure of FIGS. 1-10.

When the peripheral wall 30 comprises a frame formed by arcuate or bowed crossmembers arranged in an intersecting X-like configuration and panels of fluid-impermeable material supported thereon, as shown in FIG. 11, the tensionable members 42 are connected to the peripheral wall 30 at locations registered with the crossmembers, so as to more effectively transmit force to the gasket for sealing engagement with the roof 9. This transmission of force may be enhanced when the crossmembers are connected to the bottom periphery 23 of the covering structure and the gasket 27 is registered with same.

In the illustrated arrangement, there are provided a pair of tensionable members 42 supporting each of the retention elements 45. As such, each of the tensionable members 42 are connected at their first ends 43A to distinct locations on the peripheral wall 30 but to the respective retention element 45 at a common location thereon, such that the tensionable members 42 corresponding to a respective retention element form a V shape.

In the illustrated arrangement, the tensionable members 42 comprise lengths of resiliently stretchable material, for example elastic, such that the members 42 are automatically tensioned upon stretching between the opposite ends 43A, 43B. Thus, in a relaxed or non-tensioned state or condition of the resiliently stretchable members 42, the second ends 43B are located within the space 32 of the external portion that is external to the vehicle cabin 4 when the covering structure is mounted to the roof 9.

Also, in the illustrated arrangement, the retention elements 45 comprise rigid elongate members arranged to be sized larger than the roof opening 3 in at least one dimension thereof for butting engagement with the interior side of the roof at opposite locations across the roof opening. Thus, the retention elements 45 in the form of bars act to attach to the vehicle cabin by being sized and shaped to resist passage from the cabin 4 and through the roof opening 3 once buttingly engaged at opposite ends with the interior of the roof. Each member 45 is elongated in a respective longitudinal direction thereof and extends between opposite ends 46. In the illustrated arrangement, the members 45 extend longitudinally thereof along respective linear paths. As such, the rigid elongate members 45 are arranged to span across the roof opening 3 and extend beyond the same to provide, at opposite end portions 45A thereof defining the opposite ends 46, upwardly-facing engagement surfaces 45B for contacting the interior side of the roof at locations spaced about a periphery the roof opening. Each member 45 thus includes a bridging portion 45C intermediate the end portions 45A to interconnect the same, (upper) surfaces of which are free from engagement with the interior of the cabin. When the members 45 are in contact with the interior side of the roof in an engaged or retaining position, the members are generally horizontally oriented and otherwise generally parallel to a plane of the roof (at least at the location of the roof opening). It will be appreciated that in the engaged or retaining position, the tensionable members 42 carrying the retention elements are under tension or in respective stretched conditions. Preferably, the members 45 are in the form of bars with a flat or planar surface arranged to face upwardly in the engaged position, so as to avoid marking or otherwise damaging the interior side of the roof.

In the illustrated arrangement, the retention bars 45 are provided in opposite pairs supported in horizontally spaced relation to each other from the external portion of the covering structure. This may act to distribute the applied force of the tensioned members to the external portion of the covering structure.

To assist with passing the retention members 45 through the roof opening 3 and to fit different sizes of roof opening, the retention members 45 are adjustable in length, that is longitudinally between their ends 46, so as to be positionable between respective retracted or compacted conditions, in which the members 45 are sized in length to pass through the roof opening in generally horizontal orientations, in which the members are more horizontal than upright, and respective extended conditions, in which the end portions 45A are positioned for engagement with the interior side of the roof at opposite locations thereon. For example, each retention bar 45 comprises telescopic sections which are extensible from a central section defining a minimum length of the member.

Since the retention bars are located within the vehicle cabin and at heights above the seats, the covering structure further includes hooks 47 supported on the retention elements and arranged to be free from engagement with the interior cabin for carrying articles to be hung thereon inside the cabin.

To install the covering structure, the external portion thereof is located on the roof 9, externally of the vehicle, to register the bottom opening 25 with the roof opening 3. The roof opening 3 is substantially unobstructed or uncovered by the cover 14. Then, the securement device 40 is passed from a location external to the cabin 4, through the roof opening 3, so as to cross a plane defined thereby, and into the cabin 4 for engagement inside the vehicle. By anchoring a portion of the securement device 40 to within the vehicle cabin 4, the securement device 40 acts by tension to urge the gasket 27 into sealing engagement with an exterior surface of the vehicle roof. In this manner, fluid, particularly air, is forced to pass into the covering structure through the openings 36 and not between the covering structure and the roof.

To restrict the wall openings 36 to communicating fluid, such as air, but not animals or solid debris, for example, the wall openings comprise mesh spanning respective peripheries of the openings.

Referring to FIGS. 5-8, to control fluidic communication through the one or more wall openings 36, the peripheral wall 30 includes one or more opening covers 50 supported in respective adjacent movable relation to the one or more wall openings. The wall opening covers 50 are respectively sized and shaped to cover the wall openings 36. Each of the opening covers 50 is movable relative to a corresponding one of the wall openings 36 between a closed position in which the wall opening is closed by the opening cover to resist exchange of air therethrough and an open position in which the wall opening is at least partially uncovered by the flap to permit exchange of the air therethrough. The opening covers are disposed internally of the covering structure so as to be accessible from the vehicle cabin for manual repositioning between closed and open positions. Preferably, the opening covers are made of fluid impermeable material, which can be the same as the peripheral wall. When the peripheral wall is made of a flexible sheath supported by a frame, the opening covers 50 may be integrally formed therewith. In the illustrated arrangement as shown in FIGS. 5-8, only the wall opening 36 facing rearwardly of the vehicle 1 is uncovered, the corresponding cover 50 being in a rollingly stored open position, while the remaining openings 36 are covered by corresponding covers 50 arranged in closed positions.

Figure 9:
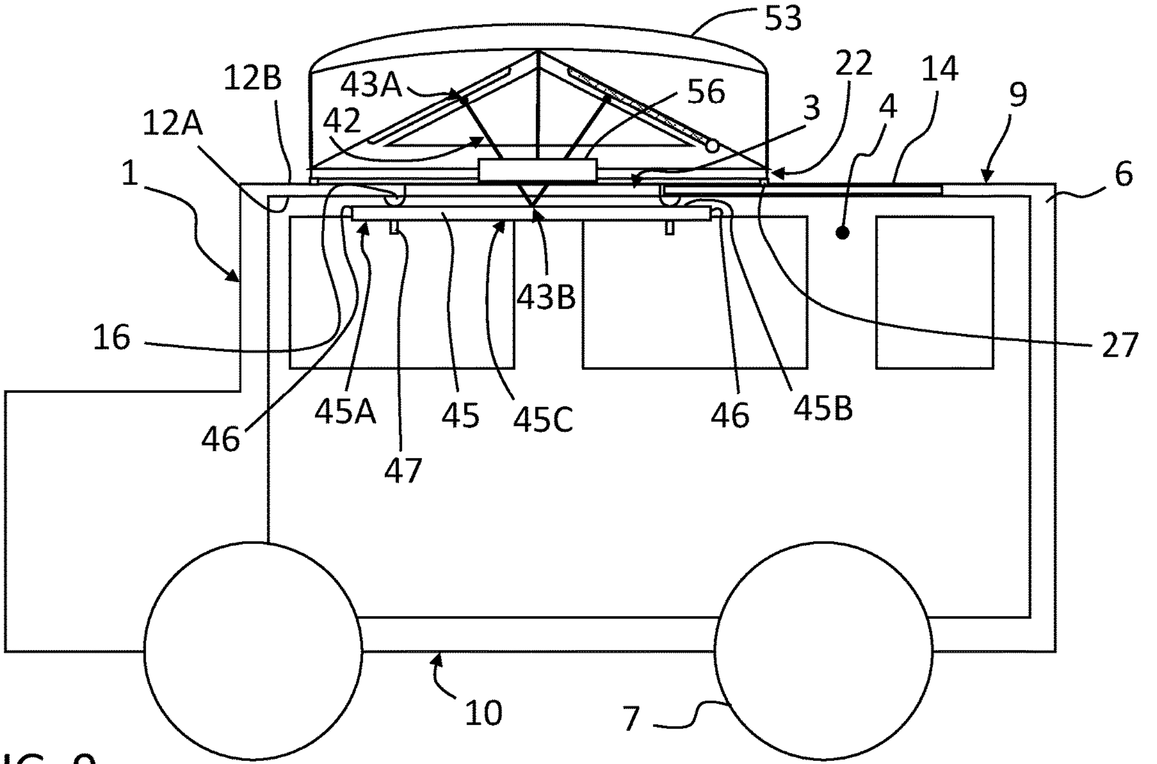
FIGS. 9 and 10 are similar to FIGS. 5 and 6 and show the same arrangement of covering structure mounted to the vehicle but with components previously omitted.
Figure 10:
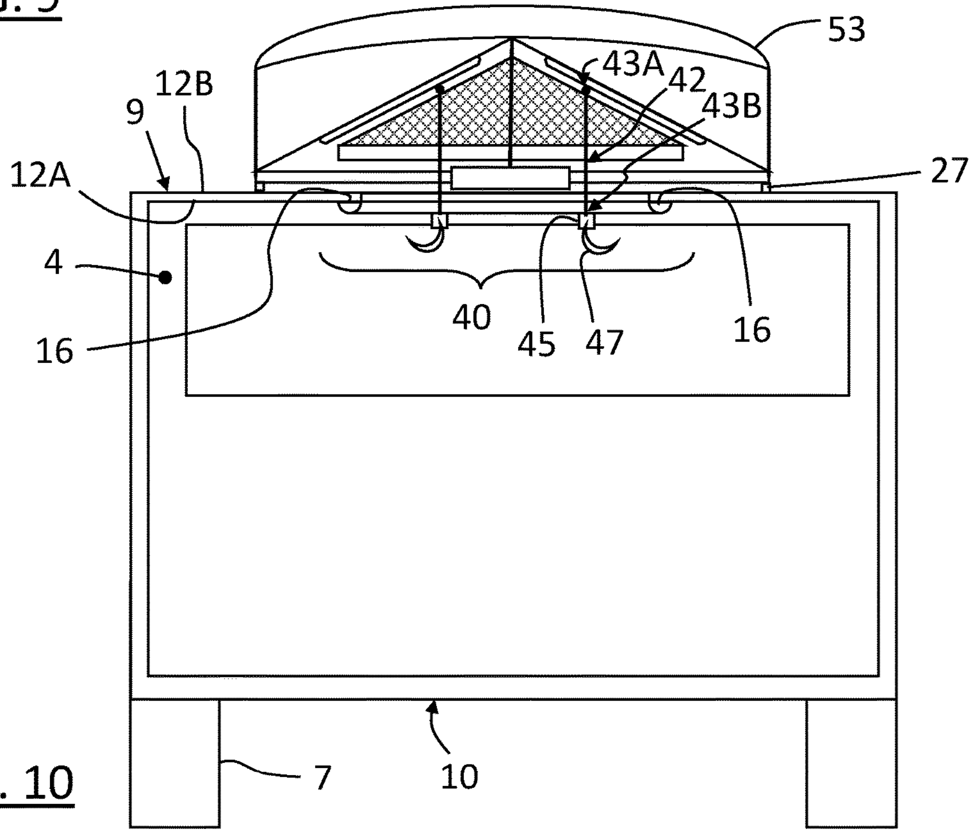

Referring to FIGS. 9-10, to prevent passage of fluid in the form of precipitation through the wall opening 36, the covering structure 20 further includes one or more precipitation shields 53 supported externally of the space 32 of the external portion and above the one or more wall openings 36. The one or more precipitation shields extend outwardly from positions at or adjacent tops of the one or more wall openings 36 to distal ends which, relative to a horizontal direction, extend at least to bottoms of the wall openings 36 so that precipitation is resisted from passing therethrough. Preferably, there are provided plural precipitation shields, respectively for each of the wall openings 36. As more clearly shown in FIGS. 9-10, the one or more precipitation shields may comprise by a single sheet of fluid impermeable material draped over the peripheral wall but supported in spaced relation thereto, for example by one or more frame members, so as not to obstruct airflow into the space. Preferably, the one or more precipitation shields extend outwardly and downwardly along respective arcuate paths. The shields 53 may also act to block sunlight from passing into the cabin through the roof opening 3.

To increase ventilating airflow from the ambient environment and into the vehicle cabin 4, the covering structure optionally includes a fan 56 configured to be driven by a power source and supported by the external portion. The fan 56 is arranged to be supported at a prescribed height relative to the vehicle body floor 10, which is at least as high as the roof opening 3.

In the illustrated arrangement, the bottom periphery 23 has a plurality of distinct sides, which typically are linear such that the periphery 23 is polygonal. Thus, the peripheral wall 30 follows the bottom periphery 23 and has a plurality of upstanding sides, which face in different directions. The wall openings 36 are located in different sides so as to face in different directions.

Figure 12:
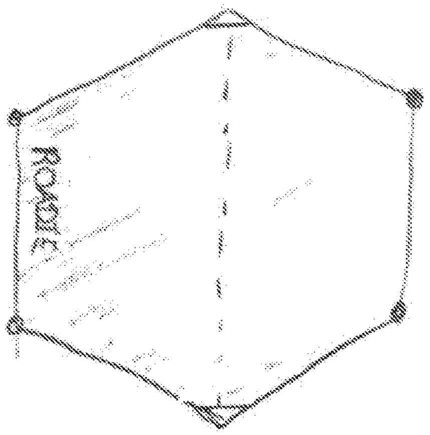
Figure 13:
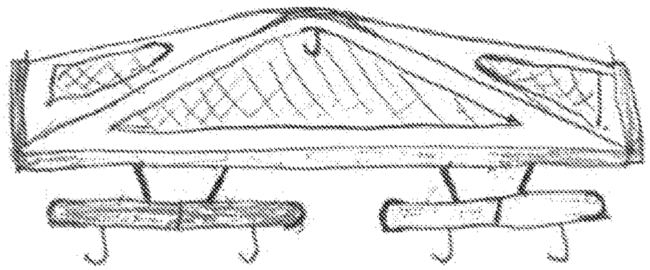

In the arrangement more clearly shown in FIGS. 11-13, the base 22 and the peripheral wall 30, shown in FIG. 11, are formed by a flexible sheet of fluid impermeable material which is supported by arcuate or bowed frame members to provide a domed shape to the wall 30 thereby forming an external space 32 to the vehicle cabin 4. The sheet locates distinct meshes which form the wall openings 36. The gasket may be formed by a flexible compressible material lining a peripheral edge of the sheet.

Furthermore, as shown in FIG. 13, in this arrangement, the first ends of the tensionable members 42, which are fixed, are connected at or adjacent the base 22, immediately above the gasket 27. Thus, the force applied to the external portion upon tensioning of the members 42, which has a downward portion, acts substantially on the gasket to press it into sealing engagement with the roof 4.

The precipitation shield 53 may further comprise a distinct frame member to provide shape to a flexible sheet overtop the peripheral wall, as shown by the central member extending between the dotted lines denoting the shield of FIG. 12 in phantom. The precipitation shield is then anchored to the external portion, for example at or adjacent the base 22.

There is also disclosed herein a method of ventilating an interior cabin of a vehicle through a roof opening thereof, which comprises the steps of:

providing, over the roof opening 3, the covering structure 20 with wall openings 36 facing in different outward directions and opening covers 50 respectively associated with the wall openings and configured for selectively closing the wall openings; and with the roof opening 3 uncovered or opened, and based on a direction of wind, arranging the opening covers 50 such that a corresponding wall opening 36 facing the direction of the wind is uncovered and the remaining openings are closed to duct the wind into the interior cabin.

Typically, the step of providing the covering structure over the roof opening comprises mounting the covering structure to the vehicle. In the illustrated arrangement, mounting to the vehicle comprises securing the covering structure to the interior cabin of the vehicle, via the roof opening.

To provide force ventilating airflow, the method may further include providing the powered fan, driven for rotation by a power source, in suspended condition to the covering structure at a prescribed height which is at least as high as the roof opening, and operating the fan to push air from the ambient environment and into the interior cabin of the vehicle.

Since the vehicle is mobile so as to be movable from one location to another, the covering structure is considered temporary and is intended to be assemblable and disassemblable. As such, the securement device is configured to releasably attach to the interior cabin 4, which in the illustrated arrangement is provided by hooking action or engagement of the hooks 45 reaching around the trim piece 16 to locate free ends of the hooks in engagement with the interior side of the roof.

This provides an arrangement for use with an opened or uncovered roof opening to ventilate the interior cabin, which is secured to the vehicle from inside the interior cabin. As such, this arrangement is suited for use regardless of a material of an outer surface of the vehicle roof, for example glass, aluminum or steel. This also provides an arrangement which is suited for acting as an air scoop to duct wind into the interior cabin.

As described hereinbefore, the present invention relates to a covering structure for use with a roof opening in a vehicle to ventilate an interior cabin thereof, which comprises a base supported on an exterior side of a vehicle roof, an upstanding peripheral wall enclosing a space above the roof and registered with the roof opening, one or more openings in the wall to communicate the space with an ambient environment and a securement device for anchoring to the vehicle, which is configured to extend from the space enclosed by the peripheral wall and through the roof opening to the interior cabin so as to attach inside the vehicle. The covering structure can be operated as an air scoop by closing, using movable covers, the majority of the wall openings except for those facing the wind, so that the peripheral wall acts to duct the admitted air into the cabin through the roof opening.

The scope of the claims should not be limited by the preferred embodiments set forth in the examples but should be given the broadest interpretation consistent with the specification as a whole.

The invention claimed is:

1. A covering structure for use with a roof opening of a vehicle to ventilate an interior cabin thereof, wherein the vehicle has a body supported for movement across a support surface and forming the interior cabin configured to receive occupants of the vehicle, wherein the body includes a roof at a top of the body and locating the roof opening, wherein the roof has an interior side delimiting the interior cabin and an exterior side opposite thereto, wherein the roof includes a cover movable relative to the roof opening between a closed position in which the roof opening is closed by the cover and an open position in which the roof opening is at least partially uncovered so that air can be exchanged between the interior cabin and an exterior of the vehicle, the covering structure comprising:

a base configured for resting on the exterior side of the roof and defining a bottom periphery of the covering structure arranged to encompass the roof opening, wherein the base has a bottom opening configured to be registered with the roof opening of the vehicle;

wherein the base includes an annular gasket encompassing the bottom opening and configured to surround the roof opening for sealable contact with the exterior side of the roof of the vehicle;

a peripheral wall supported on the base and configured to form a space above the roof for communication with the interior cabin of the vehicle through the roof opening when the cover is in the open position;

wherein the peripheral wall is characterized by inclusion of one or more wall openings therein for communication of the space above the roof with an ambient environment;

wherein the base and the peripheral wall form an external portion of the covering structure arranged to be disposed externally of the body of the vehicle; and a securement device connected to the external portion and configured to anchor the external portion to the vehicle, wherein the securement device is configured to pass through the roof opening when the cover is in the open position for engagement in the interior cabin to urge the gasket into sealing engagement with the exterior side of the roof.

2. The covering structure of claim 1 wherein the securement device includes tensionable members respectively extending from first ends connected to the external portion and to second ends free from the external portion, wherein the securement device further includes retention elements supported on the second ends of the tensionable members and configured to engage the interior cabin when the tensionable members are tensioned.

3. The covering structure of claim 2 wherein the tensionable members comprise lengths of resiliently stretchable material.

4. The covering structure of claim 2 wherein the tensionable members are connected to the peripheral wall at locations thereon which are arranged to register with the roof opening in a substantially perpendicular direction to a plane defined by the roof opening.

5. The covering structure of claim 2 wherein the retention elements comprise rigid elongate members arranged to be sized larger than the roof opening in at least one dimension thereof for butting engagement with the interior side of the roof at opposite locations across the roof opening.

6. The covering structure of claim 5 wherein the rigid elongate members are adjustable in length.

7. The covering structure of claim 2 further including hooks supported on the retention elements and arranged to be free from engagement with the interior cabin for carrying articles to be hung thereon inside the cabin.

8. The covering structure of claim 1 wherein the peripheral wall includes one or more opening covers each supported in respective adjacent movable relation to a respective one of the one or more wall openings and each respectively sized and shaped to selectively cover the respective one of the one or more wall openings, wherein each of the opening covers is movable relative to the respective one of the one or more wall openings between a closed position in which the respective one of the one or more wall openings is closed by the opening cover to resist exchange of air through said respective one of the one or more wall openings, and an open position in which the respective one of the one or more wall openings is at least partially uncovered by the opening cover to permit exchange of the air through said respective one of the one or more wall openings.

9. The covering structure of claim 1 further including a fan configured to be driven by a power source and supported by the external portion in a position operable to encourage airflow between the interior cabin of the vehicle and an ambient environment outside the vehicle, via the space bound by the peripheral wall above the roof of the vehicle.

10. The covering structure of claim 1 further including one or more precipitation shields supported externally of the space of the external portion and above the one or more wall openings, wherein the one or more precipitation shields extend outwardly from positions at or adjacent tops of the one or more wall openings for preventing passage of precipitation into the space through the one or more wall openings.

11. A covering structure for use with a roof opening of a vehicle to ventilate an interior cabin thereof, wherein the vehicle has a body supported for movement across a support surface and forming the interior cabin configured to receive occupants of the vehicle, wherein the body includes a roof at a top of the body and locating the roof opening, wherein the roof has an interior side delimiting the interior cabin and an exterior side opposite thereto, wherein the roof includes a cover movable relative to the roof opening between a closed position in which the roof opening is closed by the cover and an open position in which the roof opening is at least partially uncovered so that air can be exchanged between the interior cabin and an exterior of the vehicle, the covering structure comprising:

- a base configured for resting on the exterior side of the roof and defining a bottom periphery of the covering structure arranged to encompass the roof opening, wherein the base has a bottom opening configured to be registered with the roof opening of the vehicle;
- wherein the base includes an annular gasket encompassing the bottom opening and configured to surround the roof opening for sealable contact with the exterior side of the roof of the vehicle;
- a peripheral wall supported on the base and configured to form a space above the roof for communication with the interior cabin of the vehicle through the roof opening when the cover is in the open position;
- wherein the peripheral wall is substantially fluidically impermeable;
- wherein the peripheral wall is characterized by inclusion of a plurality of openings therein that face in different outward directions for communication of the space above the roof with an ambient environment;
- wherein the base and the peripheral wall form an external portion of the covering structure arranged to be disposed externally of the body;
- a securement device connected to the external portion and configured to anchor the external portion to the vehicle; and
- wherein the peripheral wall includes a plurality of opening covers supported in respective adjacent movable relation to the wall openings and respectively sized and shaped to selectively cover the wall openings, wherein each of the opening covers is movable relative to a corresponding one of the wall openings between a closed position in which said corresponding one of the wall openings is closed by the opening cover to resist exchange of air through said corresponding one of the wall openings, and an open position in which said corresponding one of the wall openings is at least partially uncovered by the opening cover to permit exchange of the air through said corresponding one of the wall openings.

12. The covering structure of claim 11 further including a fan configured to be driven by a power source and supported by the external portion in a position operable to encourage airflow between the interior cabin of the vehicle and an ambient environment outside the vehicle, via the space bound by the peripheral wall above the roof of the vehicle.

* * * * *